(12) United States Patent
Chen

(10) Patent No.: US 6,588,307 B2
(45) Date of Patent: Jul. 8, 2003

(54) CNC LATHE WITH DOUBLE-SPEED SHIFTING FEATURE IN SPINDLE AXIS

(76) Inventor: Hsi-Kuan Chen, 13 Fl.-2, No. 92, Chung-Kung Rd., Taichung (TW)

(*) Notice: Subject to any disclaimer, the term of this patent is extended or adjusted under 35 U.S.C. 154(b) by 0 days.

(21) Appl. No.: 09/756,056

(22) Filed: Jan. 8, 2001

(65) Prior Publication Data

US 2002/0088317 A1 Jul. 11, 2002

(51) Int. Cl.$^7$ .............................. B23B 7/00; B23B 9/00
(52) U.S. Cl. ........................... 82/118; 82/133; 82/136; 82/141
(58) Field of Search .................. 82/118, 120, 121, 82/122, 123, 128, 129, 132, 133, 134, 136, 137, 138, 141, 161, 162, 903, 12, 15

(56) References Cited

U.S. PATENT DOCUMENTS

| | | | |
|---|---|---|---|
| 3,589,278 A | * | 6/1971 | Brauer et al. ............... 100/271 |
| 3,595,287 A | * | 7/1971 | Indermark ............... 144/136.9 |
| 3,937,110 A | * | 2/1976 | Renoux ........................ 82/117 |
| 4,413,539 A | * | 11/1983 | Ishizuka et al. ............... 29/36 |
| 4,719,676 A | * | 1/1988 | Sansone ..................... 29/26 A |
| 4,750,660 A | * | 6/1988 | Kamimura ............... 242/548.2 |
| 5,311,788 A | | 5/1994 | Kasuga |
| 6,082,207 A | | 7/2000 | Babinski |

FOREIGN PATENT DOCUMENTS

| | | | | |
|---|---|---|---|---|
| DE | 19547773 A1 | 6/1996 | | |
| EP | 0015300 A1 | 3/1979 | | |
| EP | 310811 A | * 4/1989 | ................. | 82/129 |
| GB | 1345431 | 1/1974 | | |
| GB | 1353568 | 5/1974 | | |
| GB | 1450752 | 9/1976 | | |
| JP | 8166054 A1 | 6/1996 | | |
| SU | 1471019 A1 | 4/1989 | | |

\* cited by examiner

*Primary Examiner*—Henry W. H. Tsai
(74) *Attorney, Agent, or Firm*—Sennigers, Powers, Leavitt & Roedel

(57) ABSTRACT

A CNC lathe with double-speed shifting feature in spindle axis comprises a frame, a screw rod pivotally disposed along a lengthwise spindle axis of the frame, a worktable assembly and a tool holder assembly; characterized in that the screw rod includes a positive thread section and a counter thread section for engaging two nuts respectively secured on the worktable assembly and the tool holder assembly; thereby when the screw rod is rotated by a servomotor, the tool holder assembly and worktable assembly are simultaneously shifted in opposite directions along the spindle axis for obtaining a relatively shifting speed at the double of conventional one, so that the non-cutting operation time of a CNC lathe is greatly reduced, and so that the overall machining speed and efficiency are improved.

8 Claims, 7 Drawing Sheets

US 6,588,307 B2

CNC LATHE WITH DOUBLE-SPEED SHIFTING FEATURE IN SPINDLE AXIS

BACKGROUND OF THE INVENTION

1. Field of the Invention

The present invention relates to a computer numerical control (CNC) lathe, and particularly to a CNC lathe using a screw rod having a positive thread section and a counter thread section in association with two nuts respectively secured on a tool holder assembly and a worktable assembly to simultaneously shift the tool holder assembly and the worktable assembly in opposite directions along a spindle axis, so as to significantly increase the relatively shifting speed between the tool holder assembly and the worktable assembly, to minimize non-cutting time of the CNC lathe.

2. Description of Related Art

Generally, in order to accomplish the purpose for cutting a workpiece by a tool, a computer numerical control (CNC) tool machine is equipped with facility for feeding the tool toward the workpiece during a cutting operation period and with facility for changing and adjusting the relative positions between the tool and the workpiece during a non-cutting operation period. In the cutting operation, the speed for feeding the tool toward the workpiece is determined by the characteristics of the material to be machined, and thus shall not be changed or increased arbitrarily. However, if the speed for shifting or adjusting the relative positions between the tool and the workpiece during the non-cutting operation period is increased, the overall machining speed and efficiency of the tool machine will be greatly improved.

FIG. 1 illustrates a conventional horizontal lathe having a spindle S horizontally and rotatably disposed on a stationary base secured on a frame of the lathe, for gripping a workpiece to be machined. Since a workpiece to be machined is gripped on one end of the spindle S pivoted on a stationary base, it is rotatable but not shiftable. A tool holder B is applied for holding a tool for cutting the workpiece, and is shiftable relatively to the workpiece. Generally, the tool holder B is reciprocatable along the spindle axis (e.g., Z-axis) by virtue of a screw rod R rotated by a servomotor M in association with a nut N secured on the tool holder B, so that the tool can get closer to or to depart away from the workpiece when the servomotor M rotates the screw rod R clockwise or counterclockwise. The tool holder B is also provided along an axis perpendicular to the spindle axis with a further screw rod, similar to the one pivotally disposed along the spindle axis, so that the tool is shiftable along another direction (e.g., X-axis) relative to the workpiece, when the further screw rod is rotated.

FIG. 2 illustrates a conventional CNC vertical lathe, in which a workpiece to be machined is gripped on a spindle pivotally disposed on a stationary worktable T. Similar to the conventional horizontal lathe as described above, a tool secured on a tool holder B of the conventional vertical lathe is reciprocatable respectively along the spindle axis (Z-axis) and the X-axis respectively by a screw rod/nut mechanism, so that the tool can get closer to or depart away from the workpiece in two-dimensional directions.

FIG. 3 illustrates a conventional CNC reverse spindle vertical lathe having a construction substantially identical with the conventional vertical lathe, excepting that a tool holder B thereof is stationarily mounted on the frame, and a workpiece to be machined is gripped on a spindle pivotally disposed on a worktable T shiftable relatively to the tool. Similar to the conventional vertical lathe as described above, the conventional reverse spindle vertical lathe is reciprocatable along the spindle axis (Z-axis) and the X-axis perpendicular to the spindle axis, respectively by a screw rod/nut mechanism, so that the workpiece is shiftable relatively to the tool in two dimensions.

Referring to the conventional manner of applying a screw rod/nut mechanism, e.g., the transmission mechanism including the screw pair of the screw rod R and the nut N illustrated in FIG. 1, to change the relative positions between a tool holder and a worktable, if one intends to increase the speed for the tool holder to get closer to or to depart away from the worktable, he can only accomplish this purpose by increasing the rotation of the screw rod by using a higher speed servo motor. It is, however, found that none of the existing servomotors available in marketplace would satisfy this need for providing a satisfactory shifting speed between the tool holder and worktable during the non-cutting operation period.

Especially, when the conventional screw rod/nut mechanism is applied to reciprocate the tool holder along a vertical axis, e.g. when the tool holder B is reciprocated along vertical Z-axis by the screw rod R in association with the nut N of the conventional CNC vertical lathe illustrated in FIG. 2, the load of the servomotor M to rotate the screw rod R for upwardly shifting the tool holder B is significantly greater than the load of the servomotor M for downwardly shifting the tool holder B, due to the weight of the tool holder B. This not only reduces the service life of the servomotor, but also is disadvantageous to the control of the operational speed. To overcome such problem as to the servomotor bearing different loads when driving a screw rod to upwardly and downwardly shift the tool holder B, the conventional art applies a chain, wire or the like to draw a balance weight, to balance the weight of the tool holder B, and to avoid the problem that the servomotor has different loads when upward and downward shifting the tool holder B. Though this is feasible and practicable, it makes a lathe complicated in construction, bulky and cumbersome, and disadvantageous for manufacture and maintenance.

Referring to the conventional CNC vertical lathe illustrated in FIG. 2, the tool holder B is shifted upward or downward when the servomotor M clockwise or counterclockwise rotating the screw rod R. Such an operation manner and construction of applying a servomotor M in association with a screw rod/nut mechanism to upward and downward shift a tool holder B, when electric power is unexpectedly off or the servo motor is not energized, the weight of the tool holder B creates a torque to rotate the freely rotatable screw rod R, and is gradually moved downward by the weight of the tool holder B. This would subsequently result in that the tool holder B collides with and damages the workpiece, worktable, or the other parts of the machine.

SUMMARY OF THE INVENTION

An object of the present invention is to provide a CNC lathe, in which the relatively shifting speed along the spindle between the tool and the workpiece is the double of the relatively shifting speed of the conventional one of applying a screw rod/nut mechanism to simply shift either the tool or the workpiece. The present invention applies a screw rod having two sections of opposite threads, namely a positive thread section and a counter thread section, in association with two nuts separately secured on a tool holder assembly and a worktable assembly to accomplish the relative movement or shifting of the tool and the workpiece along the spindle axis, so that the non-cutting operation time of a CNC lathe is significantly reduced, and the overall machining speed and efficiency are improved.

A further object of the present invention is to provide a CNC vertical lathe, in which a tool holder assembly and a worktable assembly are reciprocatably disposed along a vertical spindle axis by virtue of a screw rod having two sections of opposite threads, namely a positive thread section and a counter thread section, respectively, in association with two nuts respectively secured on the tool holder assembly and the worktable assembly, so that a servomotor, when rotating the screw rod clockwise or counterclockwise to shift the relative position along the vertical spindle axis between the tool holder assembly and the worktable assembly, is of a substantially identical and constant load, without using any additional balance weight.

A still further object of the present invention is to provide a CNC vertical lathe that can avoid the tool holder to collide with the workpiece or the machine, when the electric power is unexpectedly off or the servomotor is not energized.

Additional objects, operational principle, construction, advantages, construction, and features of the present invention will become apparent from the following description and the appended claims, taken in conjunction with the accompanying drawings, in which like reference numerals identify like elements.

PREFERRED EMBODIMENT OF THE PRESENT INVENTION

Figure 1:
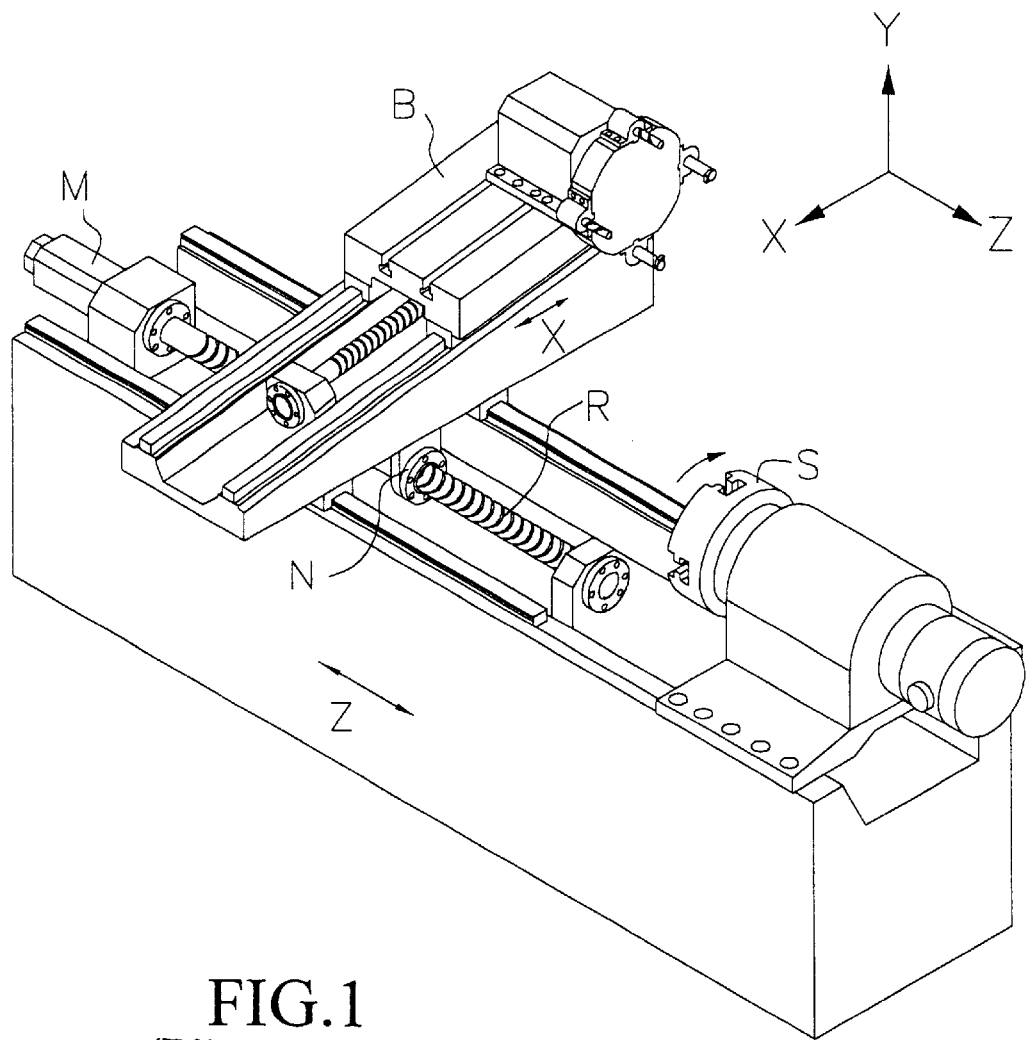
FIG. 1 is a schematically perspective view of a conventional CNC horizontal lathe, showing that the tool holder is shiftable along Z-axis (spindle axis) and X-axis to get closer to or to depart away from a workpiece gripped on the spindle, by virtue of a nut in association with a screw rod rotated by a servomotor.
Figure 2:
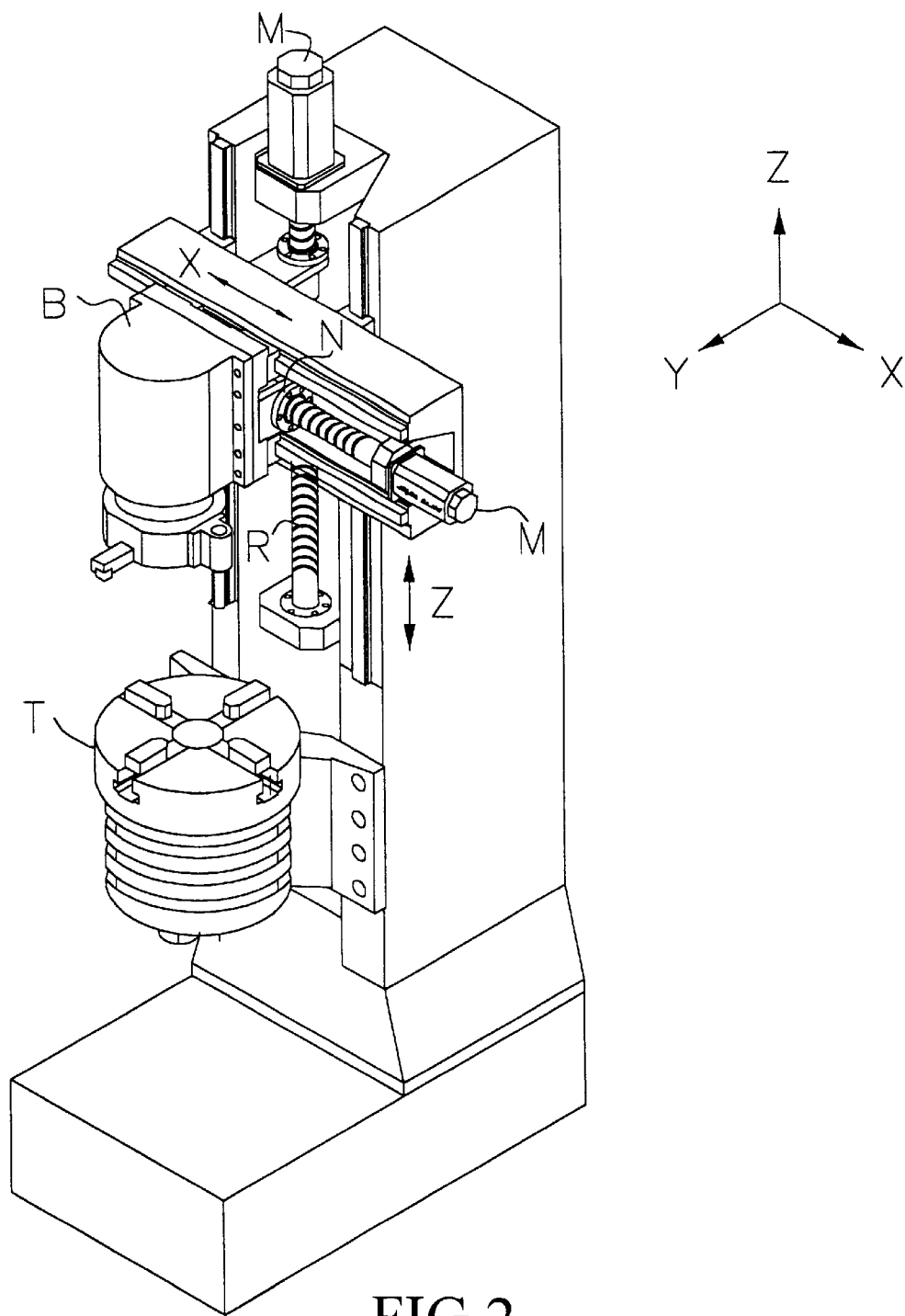
FIG. 2 is a schematically perspective view of a conventional CNC vertical lathe, showing that the tool holder is shiftable along Z-axis (spindle axis) and X-axis to get closer to or to depart away from a workpiece gripped on the spindle, by virtue of a nut in association with a screw rod rotated by a servomotor.
Figure 3:
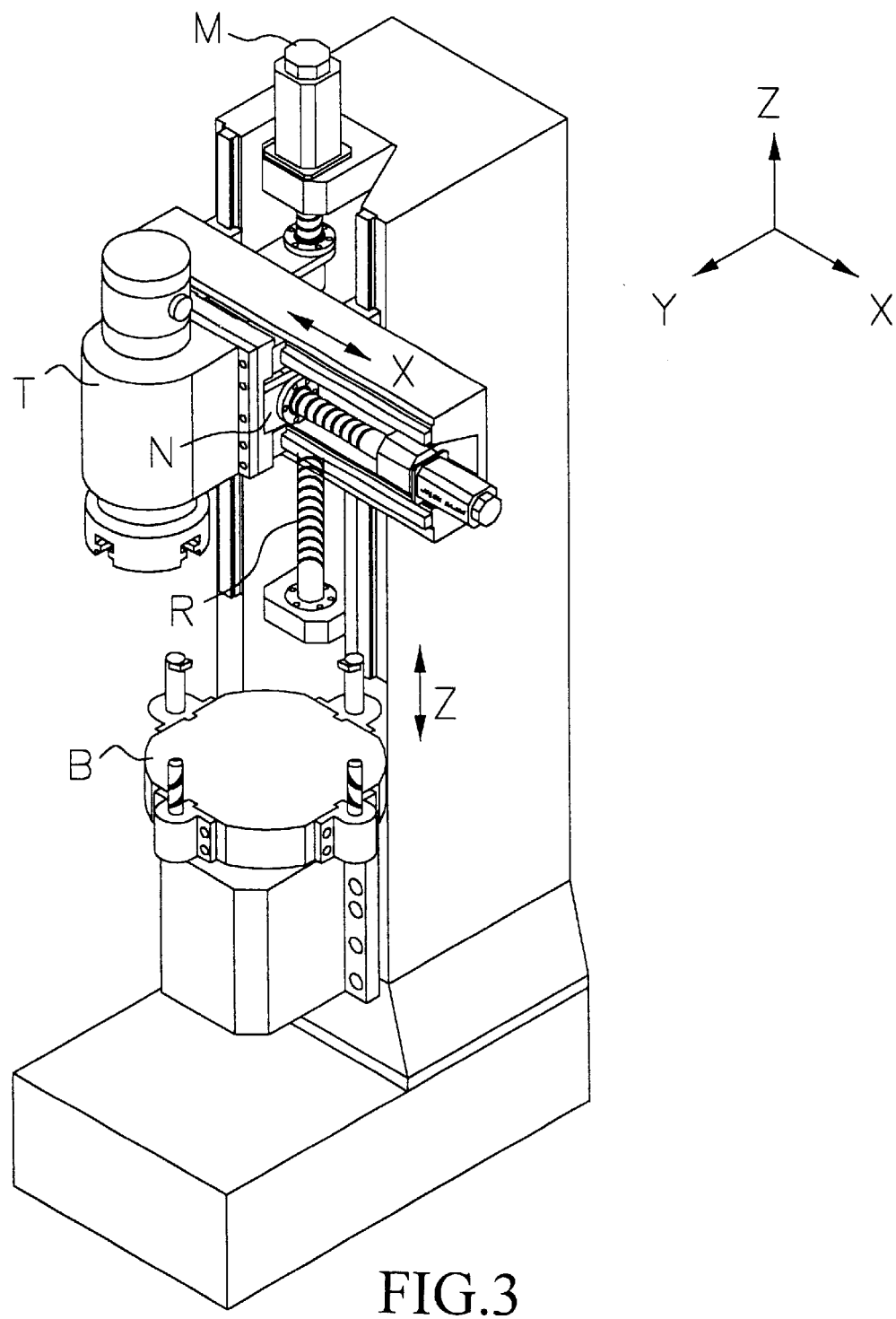
FIG. 3 is a schematically perspective view of a conventional CNC reverse spindle vertical lathe, showing that the tool holder is shiftable along Z-axis (spindle axis) and X-axis to get closer to or to depart away from a workpiece gripped on the spindle, by virtue of a nut in association with a screw rod rotated by a servomotor.

Certain terminology may be employed in the following description for convenience rather than for any limiting purpose. For example, the terms "forward," "rearward," "right," "left," "upper," and "lower" designate directions in the drawings to which reference is made, with the terms "inward," "inner," or "inboard" and "outward," "outer," or "outboard referring, respectively, to directions toward and away from the center for the referenced element, the terms "radial" and "axial" referring, respectively, to directions or planes perpendicular and parallel to the longitudinal central axis of the referenced element. Terminology of similar import other than the words specifically mentioned above likewise is to be considered being used for purposes of convenience rather than in any limiting sense. To facilitate illustration and description, X, Y, and Z axes to be mentioned hereinafter are referred to three coordinate axes perpendicular to one another and indicated in the accompanying drawings. The vertical direction is referred to a direction substantially perpendicular to the ground. Like reference numerals identify like elements in the accompanying drawings.

Figure 4:
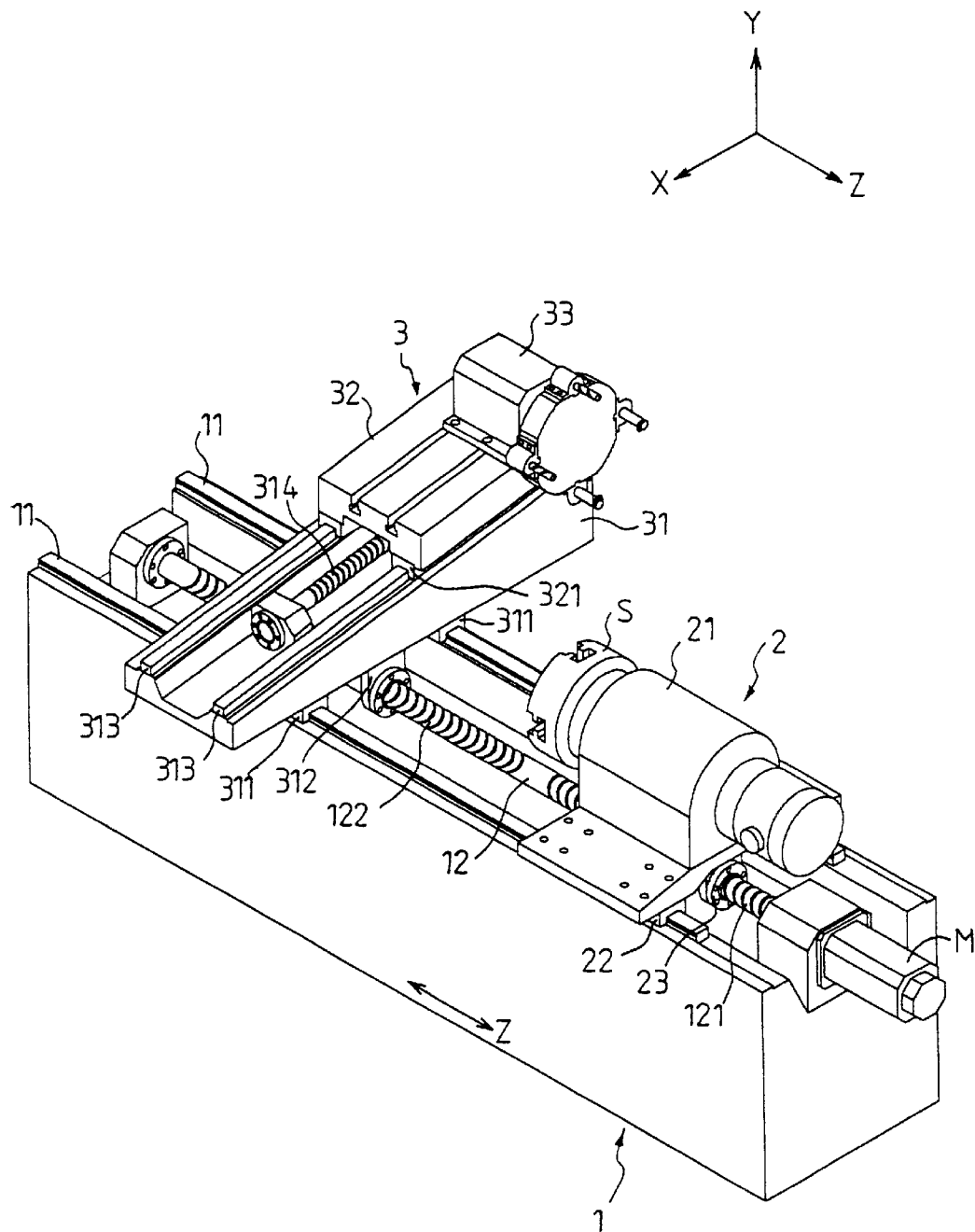
FIG. 4 is schematically perspective view of a CNC lathe in accordance with the first preferable embodiment of the present invention, showing that a CNC horizontal lathe is provided with a screw rod having two sections of opposite threads and pivotally disposed along the lengthwise spindle axis to associate with two nuts respectively secured on the tool holder assembly and the worktable assembly, so that the worktable assembly and the tool holder assembly are simultaneously shiftable in opposite directions along the lengthwise spindle axis for increasing the relatively shifting speed between the tool holder assembly and the worktable assembly.

As illustrated in FIG. 4, a CNC lathe in accordance with the first preferable embodiment of the present invention is a CNC horizontal lathe comprising a frame 1, a worktable assembly 2 and a tool holder assembly 3; wherein the frame 1 has a lengthwise spindle direction Z and a widthwise direction X perpendicular to the lengthwise spindle direction Z. Two parallel rails 11 are provided on the frame 1 along the lengthwise spindle axis direction Z. A screw rod 12 comprising a positive thread section 121 and a counter thread section 122 is pivotally disposed on the frame 1 along the lengthwise spindle axis direction Z, and driven by a servomotor M to rotate clockwise or counterclockwise.

The worktable assembly 2 comprises a worktable 21, two sliders 22 and a nut 23. The worktable 21 is provided with a machining spindle S rotatably driven by an electric motor (not shown), for gripping a workpiece to be machined at one end thereof. Two sliders 22 are secured at the bottom of the worktable 21 for separately and slidably engaging the parallel rails 11 for guiding the worktable assembly 2 to freely move on the frame 1 along the lengthwise spindle axis direction Z. The nut 23 is secured at the bottom of the worktable 21 and engages the positive thread section 121 of the screw rod 12, so that when the servomotor M rotates the screw rod 12, the worktable assembly 2 is reciprocatable on the frame 1 along the lengthwise spindle axis direction Z, by virtue of the nut 23 in association with the positive thread section 121 of the screw rod 12.

The tool holder assembly 3 comprises a Z-axis shifting seat 31, an X-axis shifting seat 32 and a tool holder 33; wherein the Z-axis shifting seat 31 is provided at its bottom two sliders 311 engaging the parallel rails 11 and a nut 312 engaging the counter thread section 122 of the screw rod 12, so that when the screw rod 12 is rotated, the Z-axis shifting seat 31 is reciprocatable on the rails 11 of the frame 1 in a direction opposite to the shifting direction of the worktable assembly 2 along the lengthwise spindle axis Z. The Z-axis shifting seat 31 is further provided along the X-axis with two parallel rails 313 and a screw rod 314 pivotally disposed thereon. The X-axis shifting seat 32 is provided at its bottom two sliders 321 for slidably engaging the parallel rails 313 and a nut (not shown) for engaging the screw rod 314, so that the X-axis shifting seat 32 is reciprocatable along X-axis when the screw rod 314 is rotated by a servomotor (not shown). The tool holder 33 is adjustably secured on the X-axis shifting seat 32.

Figure 5:
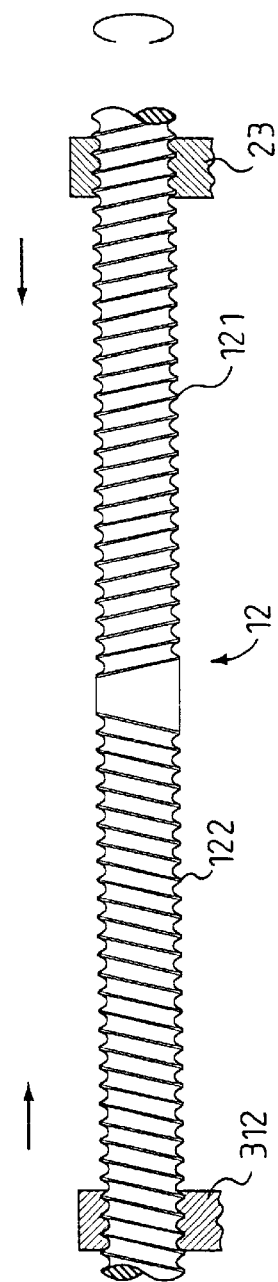
FIG. 5 is a schematically operative view of the screw rod in accordance with the present invention having a positive thread section and a counter thread section in association with two nuts respectively secured on the worktable assembly and the tool holder assembly, showing that the screw rod is rotating clockwise, so that two nuts respectively secured on the worktable assembly and the tool holder assembly are getting closer to each other.
Figure 6:
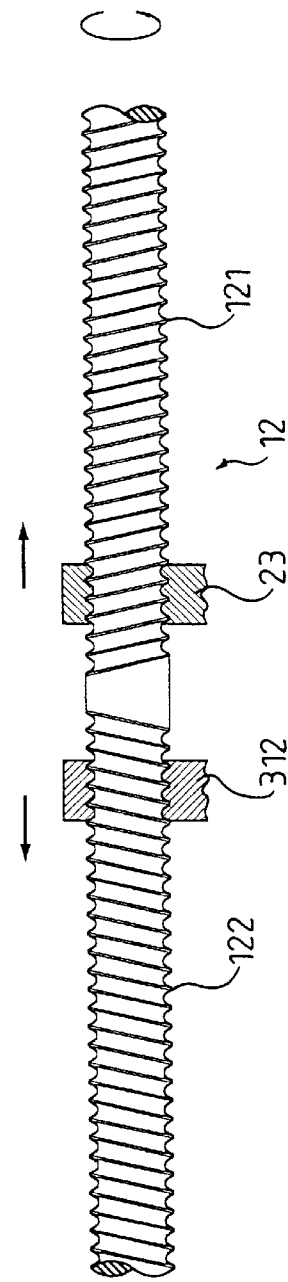
FIG. 6 is another schematically operative view of the screw rod in accordance with the present invention, showing that the screw rod is rotating counterclockwise, so that two nuts respectively secured on the worktable assembly and the tool holder assembly are departing away from each other.

Referring to FIGS. 4, 5 and 6, since the screw rod 12 pivotally disposed on the frame 1 along the spindle axis Z and comprising the positive thread section 121 and the counter thread section 122 for respectively in association with the nuts 23 and 312 respectively secured on the worktable assembly 2 and the tool holder assembly 3, when the screw rod 12 is rotated in a direction (e.g., the clockwise direction) by the servomotor M, the nuts 23 and 312 are simultaneously moved in opposite directions along the spindle direction Z to get closer to each other (see FIG. 5), rendering the worktable assembly 2 and the tool holder assembly 3 are also simultaneously moved in opposite directions along the Z-axis to get closer to each other. Referring to FIG. 6, when the screw rod 12 is rotated in the other direction (e.g., the counterclockwise direction) by the servomotor M, the nuts 23 and 312 are simultaneously moved in opposite directions along Z-axis to depart away from each other, rendering the worktable assembly 2 and the tool holder assembly 3 being also simultaneously moved in opposite directions along the Z-axis. No matter how a servomotor increases the rotation of a screw rod, the relatively shifting speed between the tool holder assembly and the worktable assembly along the spindle axis accomplished by using a screw rod 12 having a positive thread section 121 and a counter thread section 122 in association with two nuts 23 and 312 for simultaneously shifting tool the worktable assembly 2 and the holder assembly 3 in opposite directions as suggested by the present invention is the double of the conventional one accomplished by using a conventional screw rod having a single thread in association with a nut for simply shifting either the tool holder or the worktable. Therefore, the relatively shifting speed between the worktable assembly and the tool holder assembly along a primarily moving direction, e.g., the spindle axis, is significantly increased. Further, since a lathe normally requires that a tool frequently moves relatively to the workpiece along the spindle axis for a long distance, the feature of the tool holder assembly and the worktable assembly simultaneously moving in opposite directions along the spindle axis significantly reduces the non-cutting time of a CNC lathe, thereby the overall machining time is shortened and the efficiency is improved.

Figure 7:
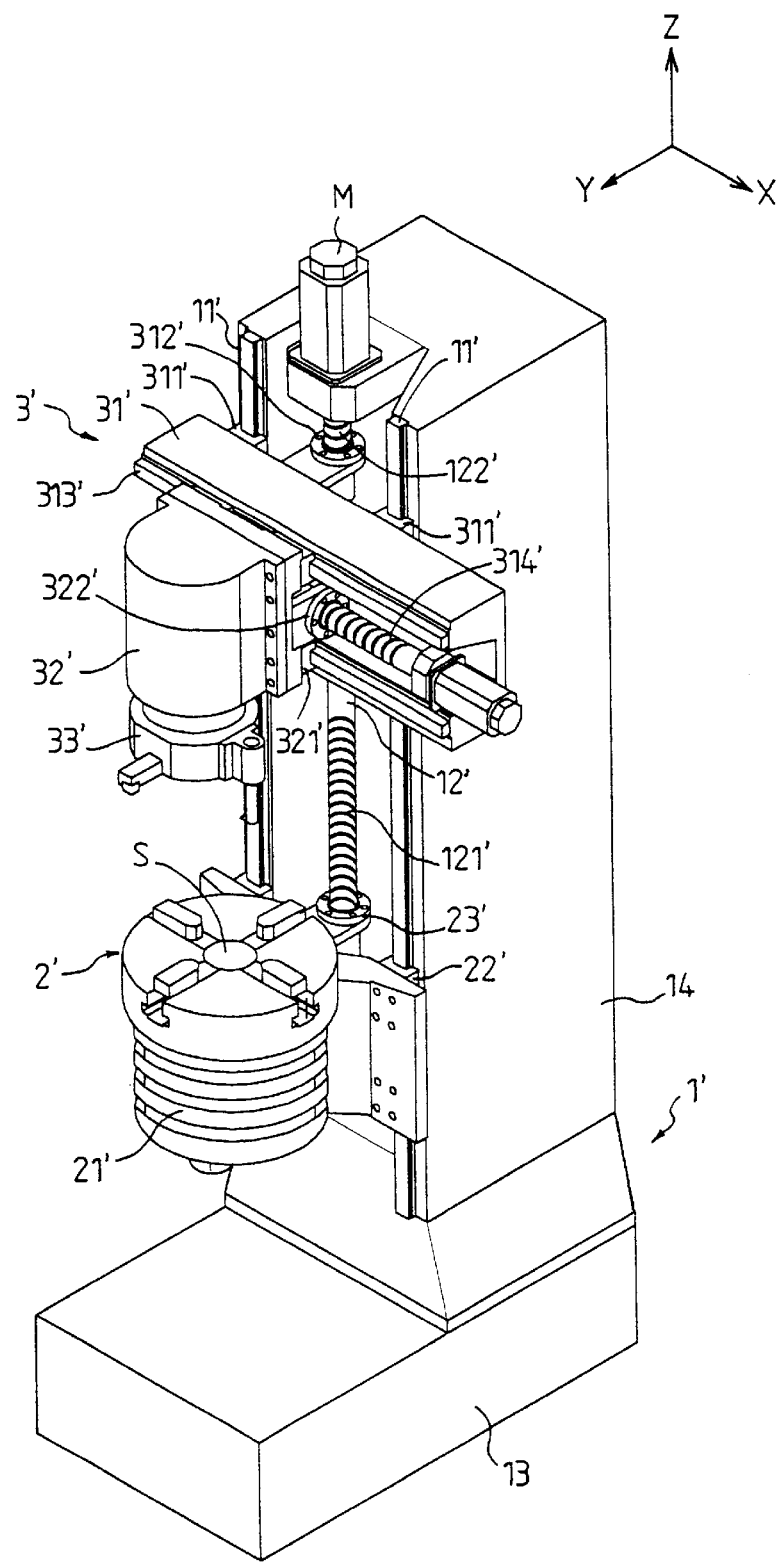
FIG. 7 is a schematically perspective view of a CNC lathe in accordance with the second preferable embodiment of the present invention, showing that a CNC vertical lathe is provided with a screw rod having two sections of opposite threads and pivotally disposed along a vertical lengthwise spindle axis, so that the tool holder assembly and the worktable assembly are shiftable simultaneously in opposite directions along the vertical spindle axis.

FIG. 7 illustrates a CNC vertical lathe in accordance with the second preferable embodiment of the present invention having a construction substantially identical with the CNC horizontal lathe illustrated in FIG. 4, excepting that the spindle thereof is extending in a vertical direction rather than in a horizontal direction. The CNC vertical lathe of the second embodiment comprises a frame 1', a worktable assembly 2' and a tool holder assembly 3', wherein the frame 1' comprises a frame foundation 13 and an upright stand 14 vertically and upward extending from the frame foundation 13. The upright stand 14 is provided with two parallel rails 11' along the vertical spindle Z-axis, and a screw rod 12' pivotally disposed along the upright stand 14. The screw rod 12' comprises a positive thread section 121' and a counter thread section 122', and is rotated by a servomotor M.

The worktable assembly 2' comprises a worktable 21', two sliders 22' and a nut 23'. The worktable 21' is provided with a machining spindle S driven by an electric motor (not shown) for gripping a workpiece to be machined. Two sliders 22' are secured at one side of the worktable 21' for respectively in association with two parallel rails 11' for guiding the worktable assembly 2' to upward and downward reciprocate on the upright stand 14 along the vertical Z-axis. The nut 23' is secured at one side of the worktable 21' for engaging the positive thread section 121' of the screw rod 12', so that the nut 23' in association with the screw rod 12' reciprocates the worktable assembly 2' upward or downward along the vertical spindle Z-axis, when the screw rod 12' is rotated by the servomotor M.

Tool holder assembly 3' comprises a Z-axis shifting seat 31', an X-axis shifting seat 32', and a tool holder 33'; wherein the Z-axis shifting seat 31' is provided at its one side two sliders 311' slidably engaging the parallel rails 11' of the upright stand 14 and a nut 312' engaging the counter thread section 122' of the screw rod 12', so that the Z-axis shifting seat 31' is reciprocatable upward and downward along the upright stand 14 along the spindle Z-axis. The Z-axis shifting seat 31' is provided at the other side thereof two parallel rails 313' extending along X-axis and a screw rod 314'. The X-axis shifting seat 32' is provided at one side thereof two sliders 321' engaging the parallel rails 313' of the Z-axis shifting seat 31' and a nut 322' engaging the screw rod 314', so that the X-axis shifting seat 32' is reciprocatable along X-axis on the Z-axis shifting seat 31'. The tool holder 33' is adjustably secured on the X-axis shifting seat 32' at one end thereof facing to the worktable assembly 2'.

Since the screw rod 12' is pivotally disposed along the vertical spindle Z-axis and formed with the positive thread section 121' and the counter thread section 122' for respectively in association with the nut 23' of the worktable assembly 2' and the nut 312' of the tool holder assembly 3', if the worktable assembly 2' is designed to have a total weight substantially equivalent to a total weight of the tool holder assembly 3', then a torque created by the weight of the tool holder assembly 3' to rotate the screw rod 12' in one direction will be countervailed or neutralized by a counter torque created by the weight of the worktable assembly 2' to rotate the screw rod 12' in the other direction. Therefore, the loads for the servomotor M for rotating the screw rod 12' clockwise and counterclockwise are substantially identical with each other, and thus it is unnecessary to provide any additional balance weight to diminish the load difference for the servomotor to rotate the vertical screw rod clockwise and counterclockwise.

During the operation of the CNC vertical lathe, if it is unexpectedly power-off when a workpiece is placed on the worktable assembly 2', since the total weight of the worktable assembly 2' and the workpiece is slightly greater than the total weight of the tool holder assembly 3', the worktable assembly 2' moves downward slowly, and creates a torque to rotate the screw rod 12' to upwardly and slowly shift the tool holder assembly 3'. As a result, the tool fixed on the tool holder assembly 3' will never collide the workpiece placed on the worktable assembly 2', when the vertical lathe is switched off or unexpectedly power-off.

Figure 8:
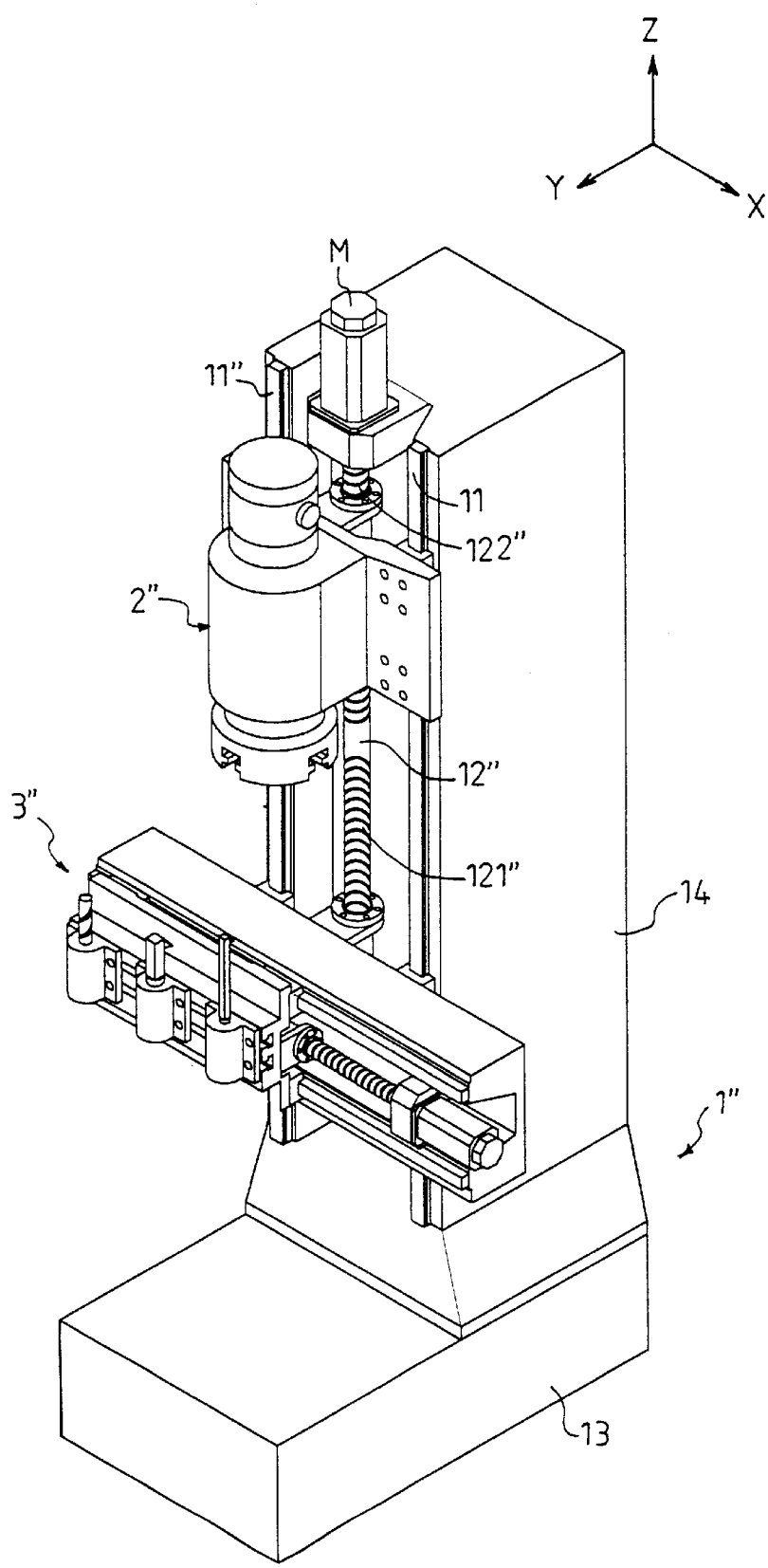
FIG. 8 is a schematically perspective view of a CNC lathe in accordance with the third preferable embodiment of the present invention, showing that a CNC reverse spindle vertical lathe is provided with a screw rod having two sections of opposite threads and pivotally disposed along a vertical lengthwise spindle axis, so that the tool holder assembly and the worktable assembly are shiftable simultaneously in opposite directions along the vertical spindle axis.

FIG. 8 illustrates a CNC reverse spindle vertical lathe in accordance with the third preferable embodiment of the present invention having a construction similar to the CNC vertical lathe of the second embodiment illustrated in FIG. 7, excepting that the worktable assembly 2" is reversely disposed above the tool holder assembly 3". The worktable assembly 2" and the tool holder assembly 3" are simultaneously reciprocatable in opposite directions along the vertical spindle Z-axis driven a positive thread section 121" and a counter thread section 122" formed on a screw rod 12". In such CNC reverse spindle vertical lathe, the tool holder assembly 3" can be designed to have a total weight substantially equivalent to or slightly greater than a total weight of the worktable assembly 2" and a workpiece placed thereof, so that the worktable assembly 2" will never collide with the tool, or tool holder assembly 3".

The above-described embodiment of the present invention is intended to illustrate only. Numerous alternative embodiments may be devised by persons skilled in the art without departing from the scope of the following claims.

What is claimed is:

1. A CNC lathe with double-speed shifting feature in spindle axis for simultaneously shifting a worktable assembly and a tool holder assembly so that the worktable assembly is shifted relative to the tool holder with a shifting speed double of a shifting speed between a worktable assembly and a tool holder assembly when only one of the worktable assembly and the tool holder assembly is moved, the CNC lathe comprising:

a frame having a lengthwise spindle axis direction and a widthwise direction perpendicular to the lengthwise spindle axis direction;

a screw rod including two sections of opposite threads, namely a positive thread section and a counter thread section, and a pivotally disposed on the frame in the lengthwise spindle axis direction;

a worktable assembly reciprocatably disposed on the frame in the lengthwise spindle axis direction, including a first nut engaging the counter thread section of the screw rod for reciprocating the worktable assembly in a shifting direction along the lengthwise spindle axis direction when the screw rod is rotated in one direction;

a tool holder assembly reciprocatably disposed on the frame along the lengthwise spindle axis direction, including a second nut engaging the positive thread section of the screw rod for reciprocating the tool holder assembly in a direction opposite to the shifting direction of the worktable assembly along the lengthwise spindle axis when the screw rod is rotated.

2. The CNC lathe with double-speed shifting feature in spindle axis of claim 1, wherein the screw rod is driven by a servomotor to rotate clockwise or counterclockwise.

3. The CNC lathe with double-speed shifting feature in spindle axis of claim 1, wherein the lengthwise spindle axis direction is a vertical direction, and wherein the frame comprises a frame foundation and an upright stand upward and vertically extending from the frame foundation; and wherein the screw rod is pivotally disposed on the upright stand along the vertical length spindle axis direction, so that the tool holder assembly and the worktable assembly are simultaneously upward or downward reciprocated in opposite directions along the vertical spindle axis direction.

4. The CNC lathe with double-speed shifting feature in spindle axis of claim 3, wherein the tool holder assembly is disposed above the worktable assembly.

5. The CNC lathe with double-speed shifting feature in spindle axis of claim 4, wherein the worktable assembly is of a weight substantially equivalent to or slightly less than a weight of the tool holder assembly.

6. The CNC lathe with double-speed shifting feature in spindle axis of claim 3, wherein the tool holder assembly is disposed below the worktable assembly.

7. The CNC lathe with double-speed shifting feature in spindle axis of claim 6, wherein the tool holder assembly is of a weight substantially equivalent to or slightly greater than a weight of the worktable assembly.

8. The CNC lathe with double-speed shifting feature in spindle axis of claim 1, wherein the frame further comprises two parallel rails disposed along the lengthwise spindle direction, and wherein the tool holder assembly and the worktable assembly are provided with sliders to associate with the parallel rails for guiding the tool holder assembly and worktable assembly to reciprocate along the lengthwise spindle axis direction.

* * * * *